Figure 1:
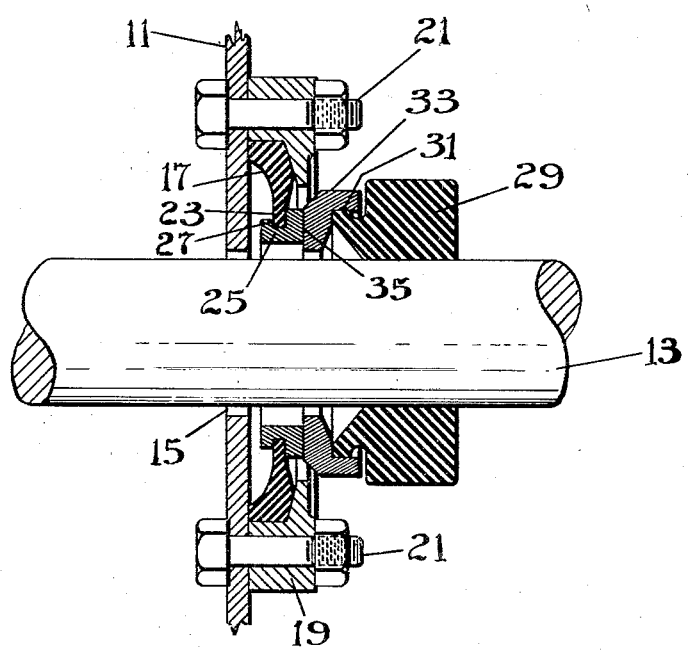

Aug. 1, 1939.    L. B. MOLYNEUX    2,167,669
SEALING STRUCTURE
Filed May 4, 1937

INVENTOR.
Lee B. Molyneux
BY Louis A. Wiebe
ATTORNEY

Patented Aug. 1, 1939

2,167,669

UNITED STATES PATENT OFFICE 2,167,669

SEALING STRUCTURE

Lee B. Molyneux, Buffalo, N. Y., assignor to E. I. du Pont de Nemours & Company, Wilmington, Del., a corporation of Delaware Application May 4, 1937, Serial No. 140,657

1 Claim. (Cl. 286—11)

This invention relates to a sealing structure, and more particularly it relates to an apparatus in the nature of a packing gland for preventing the leakage of fluids from fluid containing receptacles or devices around a rotating shaft projecting therethrough. This invention has particular utility in preventing leakage of fluids from fluid containing receptacles around rotating shafts which project therethrough and which operate under adverse conditions such as vibrations, wabbling, sidewise thrusts and the like and particularly for use in connection with corrosive liquids.

The usual type of stuffing box has many objections and drawbacks when used in connection with certain types of machinery. A fluid seal must be maintained between the surface of the rotating shaft and the stuffing material contained in a housing surrounding the shaft. The efficiency of such a seal is dependent upon the condition of the surface of the shaft, lack of vibration in the operation of the shaft, the pressure with which the stuffing is maintained in position against the shaft and the lubrication of the moving parts. Because of wear of the section of the shaft within a stuffing box, it is often impossible to obtain sufficiently intimate contact of the stuffing material with the relatively moving parts to prevent the escape of fluid. Furthermore, since the stuffing box is generally rigidly mounted upon the frame of the machine, any marked vibration in the rotating shaft will destroy the contact between the stuffing and the shaft surface. In addition, wear in the bearings may permit sideplay of the shaft, reducing the efficiency of the fluid seal. The stuffing or packing in such a type of gland is generally held in position by a cover plate, or sleeve, which is adjusted by means of lug nuts to afford proper compression. If such adjustments are not carefully made, there is great danger of causing distortion of the assembly which will cause undue friction and wear upon the shaft and a resulting power loss. Protective coatings applied to the surface of the shaft will in time be removed. With many types of stuffing box or gland, it is either impossible or very difficult to make such adjustment without stopping the machine. Where a continuous operation is involved, this may be quite costly.

It has also been proposed, heretofore, to prevent leakage between rotating shafts and fluid containing receptacles by the use of a packing gland comprising two close fitting parts, one of which is stationary and connected to the receptacle and one of which is rotatable and connected to the shaft. The stationary member in such packing glands is often connected to a flexible diaphragm positioned between the stationary parts and the receptacle. The rotatable part consists of a collar firmly and rigidly connected to the shaft. This type of a packing gland has many advantages over the old type stuffing box packing gland, however, this previously known diaphragm type of packing gland has also been found to be unsatisfactory when there is a great deal of vibration between the receptacle and the rotating shaft or when there is a noticeable sidewise thrust between the shaft and the receptacle.

It is an object of this invention to provide a sealing structure between a fluid containing receptacle and a rotating shaft which will remain fluid-tight even under conditions of marked vibration or relative sidewise or longitudinal movement of the shaft relative to the container.

It is a further object of this invention to provide an improved sealing structure between a fluid containing receptacle and a rotating shaft which will be sufficiently resilient to counteract marked vibration or relative sidewise or longitudinal movement of the shaft relative to the receptacle and thereby prevent any substantial leakage therebetween.

Other objects of the invention will appear hereinafter.

Figure 2:
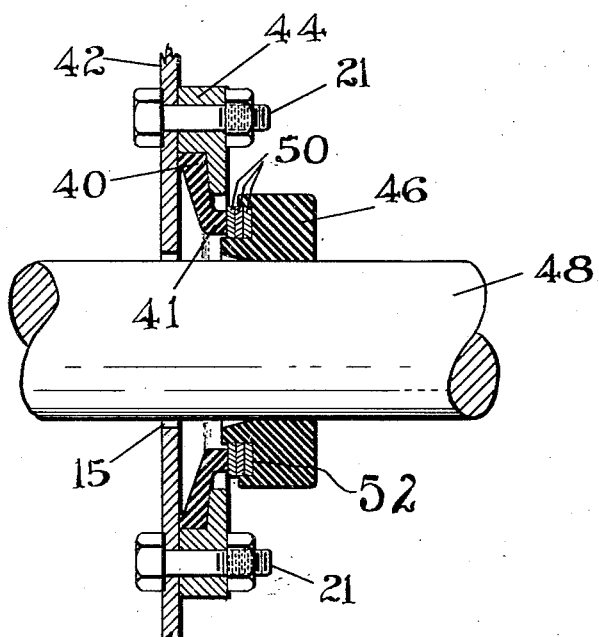

The invention will be more readily apparent by reference to the following detailed description taken in connection with the accompanying illustrations in which, Figure 1 is a vertical sectional view of one modification of a sealing structure constructed in accordance with the invention;

Figure 2 is a vertical sectional view showing a modified form of sealing structure in accordance with the present invention.

Referring to the drawing, reference numeral 11 designates a receptacle wall of a tank or the like containing a fluid medium. A rotating shaft 13 projects through an opening 15 in the receptacle wall 11. An annular, flexible diaphragm 17 composed of rubber, artificial rubber, synthetic rubber, substituted rubber, modified rubber or any other similar flexible material is positioned between shaft 13 and the receptacle wall 11. The flexible diaphragm 17 is constructed with a concentric narrow flange section 23 which will be readily yieldable. The inner concentric flange 23 of the diaphragm 17 is fitted into a groove 27 of an annular member 25. The outer concentric peripheral section of the annular diaphragm 17 is tightly clamped against the receptacle wall 11 by means of clamp 19 and bolts 21.

A resilient member 29 is positioned with a sufficiently tight fit about shaft 13 so that it will rotate therewith. The resilient member 29 may be composed of rubber or any other flexible material. The member 29 is provided with a projecting flange 31 about which is tightly fitted a member 33 so that it also will be rotated with the rotating shaft 13. The members 25 and 33 when positioned as shown in Figure 1 will have smooth frictionally cooperating surfaces which will move relative to each other upon rotation of the shaft. It is this frictional contact between members 25 and 33 which will prevent the leakage of fluid from the fluid receptacle. It is therefore desirable that the members 25 and 33 be constructed of materials which will be wear resistant and which will have very close fitting flat surfaces. These members may be composed of carbon, compressed graphite, compressed graphite and fibrous material, bearing metals, metals containing oil forced therein under pressure and similar wear-resistant, preferably self-lubricating materials.

The fluid in the receptacle will be permitted to pass through opening 15, and, if under pressure, will aid in pressing the members 25 and 33 toward each other to prevent leakage. In the present construction, both of the relatively movable members 25 and 33 are connected to resilient or flexible means and neither of them is held rigidly in a single position. It is due to the fact that member 25 is connected to the flexible diaphragm 17 and member 33 is held by means of resilient member 29 that the seal of the present invention is adapted to compensate for marked vibrations between the rotating shaft and the fluid receptacle, and will compensate for considerable lateral and longitudinal movement of the shaft relative to the receptacle.

Referring to the modification of the invention illustrated in Figure 2 of the drawing, a rubber diaphragm 40 is clamped to the sidewall of tank 42 by means of an annular retaining member 44 or the like. A resilient yieldable member 46 is positioned on the shaft 48. The member 46 is fitted on the shaft with such a tight fit that it will be leak-proof and will rotate with the shaft. A plurality of wear rings 50 is positioned in groove 52 of member 46. These rings are preferably composed of a non-metallic, substantially rigid, wear-resistant and corrosion-resistant material such as a rubber-graphite, asbestos fiber graphite composition or the like. As the wear rings 50 become worn in service, they may be broken out in turn and rubber spacer rings placed behind the remaining rings to retain the same in proper position on member 46. The flange 41 of the rubber diaphragm in this modification will rotate directly on the stationary wear rings. The rubbing surface of the wearing rings and flange 41 must therefore be made very smooth to eliminate leakage.

Obviously when the sealing structures above described are to be used in sealing fluids or liquids which are corrosive, the various elements should be constructed of corrosion-resistant materials, and the cooperating friction members should be composed of such materials as will satisfactorily resist the corrosive tendencies of the fluid or liquid in the receptacle. When the liquids to be sealed in the tank are corrosive, the various elements of the sealing structure should be composed of non-metallic materials to prevent an electrolytic action between the metal of the tank or shaft and the metal of the sealing structure. It has been found that particularly good results can be obtained, if the corrosive liquid is composed of an alkali or acid, when the friction members are composed of a mixture of asbestos, rubber and graphite. This material which is known to the trade as "Eelslip" is not only corrosion resistant but is self-lubricating in nature.

The sealing device of the invention has many advantages over devices heretofore available. A very excellent seal is obtained therewith and will be maintained over a long period of time with little or no attention. It is not possible for the device to cause binding of the shaft as was experienced with previous devices. Due to no cause can pressures be secured between rubbing surfaces greater than are inherent in the design, and thus the power load will be practically constant regardless of age or adjustment. The seal of this device is self-adjusting with the fluid pressure and is self-lubricating. It is readily adjustable while the machine is in operation. The bearing surfaces of the seal may be made of corrosion resistant material and are independent of the material of the shaft. Protective, corrosion resistant coatings upon the surface of the shaft need not possess high strength or good surface wear characteristics, since they will receive no wear whatever from the packing device. The construction and assembly of the device is very simple and the parts may be readily replaced. It is unnecessary to accurately align the packing glands with the bearings and a slight discrepancy in this alignment will cause no additional wear or power loss.

It will be obvious that many changes and modifications can be made in the above described apparatus without departing from the nature and spirit of the invention and it is therefore understood that the invention is not to be limited except as set forth in the appended claim.

I claim:

A sealing structure for a container wall having an opening through which a rotatable shaft extends, comprising a flexible self-sustaining apertured diaphragm of rubber or like material, having its outer edge clamped against the side of the container in fluid-tight relation, a stationary friction ring engaging the inner edge of said diaphragm, a resilient ring tightly fitting on said shaft for rotation therewith and having a flange supporting a rotatable friction ring for contact with said stationary friction ring, said resilient ring fitting said shaft in liquid-tight relationship and being capable of adjustment along the shaft during rotation thereof.

LEE B. MOLYNEUX.